J. P. Manton,
Windlass.

N° 19,787.   Patented Mar. 30, 1858.

UNITED STATES PATENT OFFICE.

JOS. P. MANTON, OF PROVIDENCE, RHODE ISLAND.

WINDLASS.

Specification of Letters Patent No. 19,787, dated March 30, 1858.

*To all whom it may concern:*

Be it known that I, JOSEPH P. MANTON, of Providence, in the county of Providence and State of Rhode Island, have invented a new and useful Improvement in Windlasses Designed More Particularly for Ships and other Navigable Vessels; and I do hereby declare that the following is a full, clear, and exact description of the same, reference being had to the annexed drawings, making a part of this specification, in which—

Figure 2:
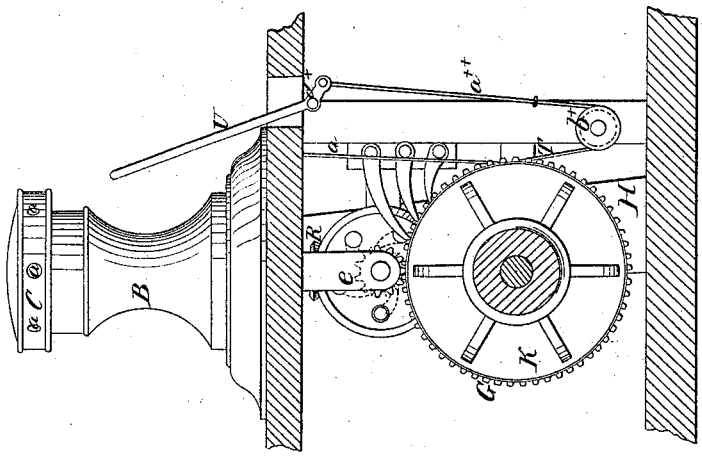
Figure 1:
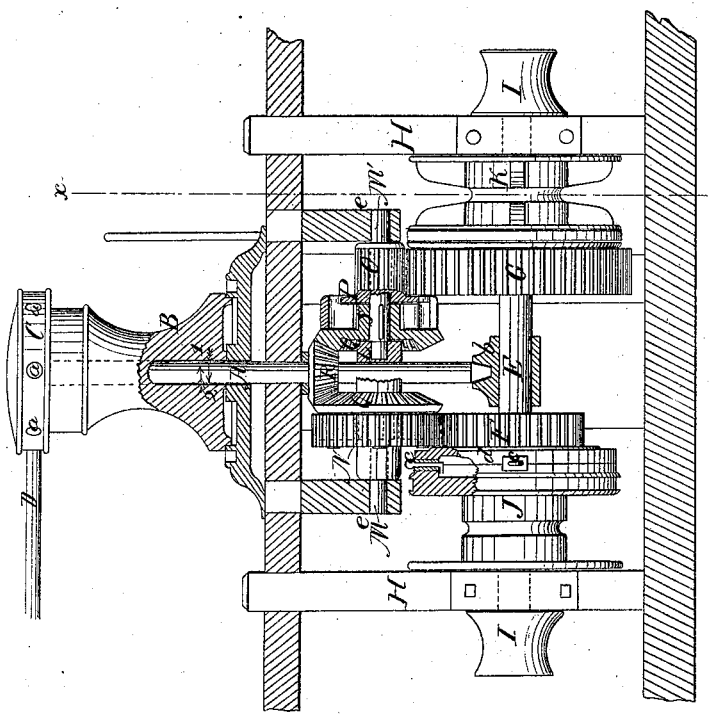
Figure 4:
Figure 3:

Figure 1, is a side elevation of a windlass constructed according to my improvement, a portion of the parts being vertically bisected. Fig. 2, is a vertical section of ditto, taken in the line $(x)$ $(x)$ Fig. 1. Fig. 3, is a detached view of the interior of the hollow toothed wheel which contains one set of pawls. Fig. 4, is a detached view of the interior of the hollow hub or box, which contains the other set of pawls.

Similar letters of reference indicate corresponding parts in the several figures.

This invention relates to an improvement in that class of windlasses in which the drum may be operated with two different speeds, and power obtained when necessary by sacrificing speed, and vice versa.

The invention consists in a peculiar arrangement of pawls and gearing as hereinafter described, whereby the desired end is attained by a very simple means, rendering the windlass as a whole extremely light, durable and efficacious in its operation.

To enable those skilled in the art to fully understand and construct my invention I will proceed to describe it.

A, represents a vertical arbor or shaft on the upper part of which a capstan B, is placed loosely, and to the upper end of the arbor or shaft A, a head C, is permanently attached, said head being provided with holes $(a)$ to receive hand levers D. The lower end of the arbor or shaft A, is stepped in a block $(b)$ which is properly supported in any suitable way, and through the block $(b)$ a shaft E, passes, the shaft being allowed to turn freely in said block. The arbor or shaft A, is perpendicular to the shaft E, and on the latter two toothed wheels F, G, are permanently secured, the wheel F, being smaller than the wheel G. The shaft E, is fitted in suitable bearings in uprights H, H, and on each end of the shaft E, a head I, is placed and permanently attached. On the shaft E, two heads J, K, are also placed. The heads J, K, however are placed loosely on the shaft E, and are connected to the shaft E, or made to turn with it by means of keys $(c)$ which connect the heads to the wheels F, G, the heads adjoining the wheels respectively as shown in Fig. 1. The head J, is not in contact with the wheel F, but it adjoins a flanch or circular plate $(d)$ connected with wheel F, and the keys $(e)$ are inserted in holes or recesses which are formed radially in the head J, at its inner side and in the outer side of the flanch or plate $(d)$ one half of each hole or recess in each. The head K, is in contact with the wheel G, and the keys $(c)$ which connect head K, with wheel pass horizontally through the wheel into the head.

The arbor or shaft A, passes loosely through a block L, which forms the inner bearings for two horizontal shafts M, M′, the outer ends of said shafts having their bearings at $(e)$, $(e)$. On the shaft M, a toothed wheel N, is placed loosely, and on the shaft M′, a pinion O, with a hollow cylindrical hub P, attached, is placed loosely. On the shafts M, M′, bevel wheels Q, Q′, are placed. These wheels are permanently attached to their respective shafts and gear into a bevel pinion R, on the vertical arbor or shaft A. To each wheel Q, a ratchet S, is attached, said ratchet being concentric with the wheels. The wheel Q, adjoins the inner side of the hollow hub D, and the other Q′, adjoins the inner side of the wheel N, the ratchet S, of the bevel Q being within the wheel N, which is hollow and has a series of pawls $(f)$ fitted within it, the axis of each pawl being fitted within semi-circular bearings $(g)$ near the inner side of the periphery of the wheel, and each pawl has a tenon or arm $(f^x)$ which pass respectively through the outer sides of the wheel and hub. The tenons or arms $(f^x)$ of the pawls which are fitted in the hub P, are shown in Fig. 1. See Fig. 3. The ratchet S of the wheel Q′, is fitted within the hub P, which hub is provided with pawls $(h)$ arranged precisely similar to those in the wheel N, with the exception that they are placed in a reverse position the teeth of the ratchet into which they catch being also in a reverse position to the other ratchet in the wheel N. See Fig. 4.

From the above description it will be seen that if the arbor or shaft A, be turned in the direction indicated by arrow 1, the ratchet S, of the wheel Q, will act against the pawls ($h$) in the hub P, and the pinion O, which is attached to said hub will rotate the shaft E, through the medium of the larger toothed wheel G. And it will also be seen that if the arbor or shaft A be rotated in a reverse direction as indicated by arrow 2, the ratchet of wheel Q, will slip over the pawls ($h$) and the ratchet of wheel Q′, will engage with the pawls ($f$) in the wheel N, and the shaft E will be rotated through the medium of the wheels N, N, and owing to the relative proportion of the wheels N, F, with a greater speed than when rotated by the gearing O, G.

Around one side of the head K, a strap T, passes. One end of this strap is connected to a rod ($a^x$) the upper end of which is connected to any part of the framing, and the opposite end passes underneath a pulley ($b^x$) and is connected by a rod ($c^x$) to a lever U, which has its fulcrum at ($d^x$). This device formes a friction brake and by its application the speed of the chain as the anchor descends may be regulated as desired, a brake being applied to both heads J, K.

V, represents a series of holding pawls which gear into the wheel G.

By having the pawls ($f$) ($h$) fitted respectively in the wheel N, and hub P, as described, they are firmly secured in position, protected from external injury, kept free from dust and effectually prevented from getting out of order.

I do not claim the brakes for they have been previously used, and I am also aware that pawls, ratchets and gearing have been used and arranged in various ways for the purpose of varying the speed and power of windlass drums by simply reversing the movement of the driving shaft or arbor. I therefore do not claim broadly such device, irrespective of the within described arrangement of parts, but

I claim as new and desire to secure by Letters Patent,

The arrangement of the pawls $g$, $h$, wheel N, hub P, ratchets S, and gearing Q, Q′, R, F, G, so as to operate as and for the purpose herein set forth.

JOSEPH P. MANTON.

Witnesses:
  HENRY A. BILLINGS,
  FRANKLIN OLDS.